March 6, 1934.   G. O. FROSTAD   1,949,999
TUBE CUTTING MACHINE
Filed Dec. 10, 1928    3 Sheets-Sheet 2

INVENTOR
George O. Frostad
by Byrnes, Stebbins & Parmelee
his attorneys

March 6, 1934. G. O. FROSTAD 1,949,999
TUBE CUTTING MACHINE
Filed Dec. 10, 1928 3 Sheets-Sheet 3
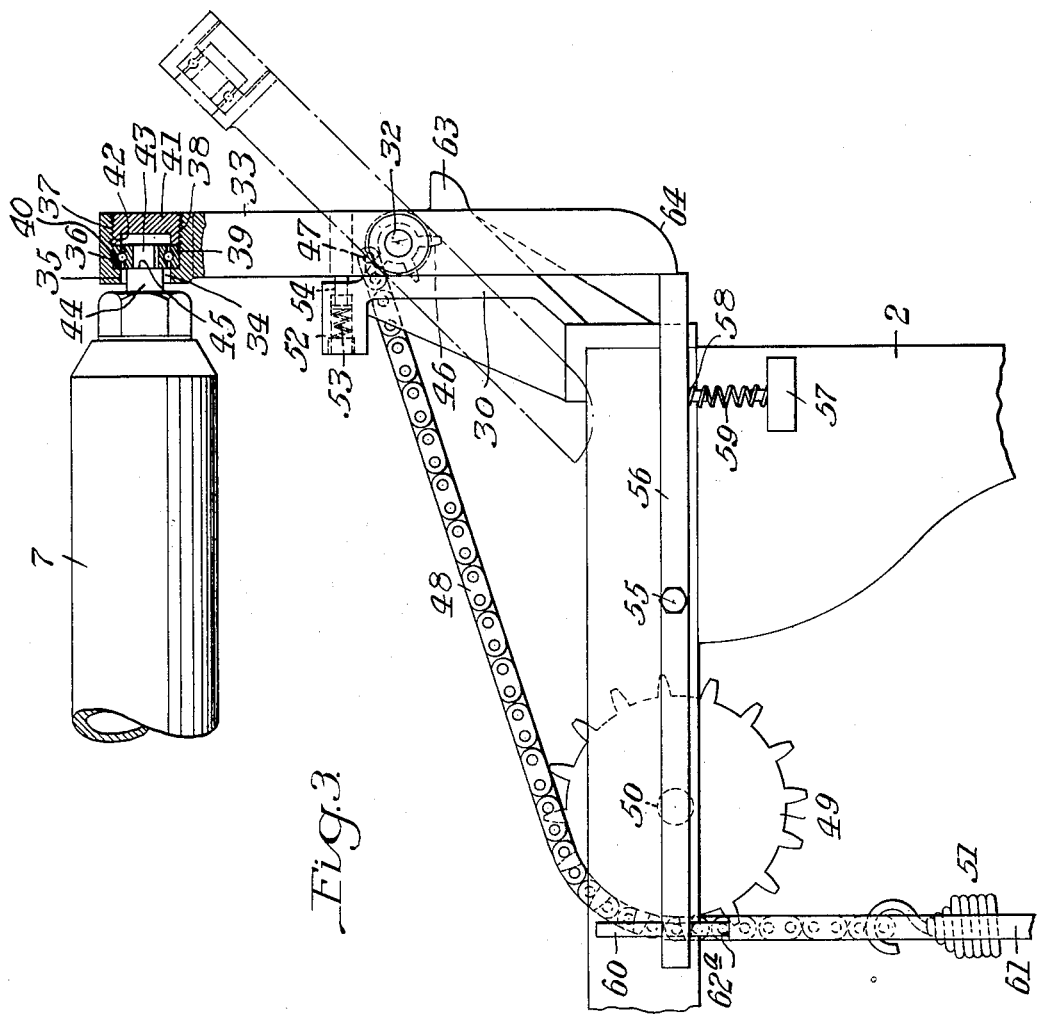
INVENTOR
George O. Frostad
by Byrnes, Stebbins & Parmelee
his attorneys Patented Mar. 6, 1934

1,949,999

UNITED STATES PATENT OFFICE 1,949,999

TUBE CUTTING MACHINE

George O. Frostad, Milwaukee, Wis., assignor to National Paper Can Company, Milwaukee, Wis., a corporation of Wisconsin Application December 10, 1928, Serial No. 324,946

9 Claims. (Cl. 164—69)

This invention relates broadly to tube cutting machines and more particularly to a tube cutting machine having a mandrel upon which a finished tube of fibrous or other material is adapted to be placed, such mandrel being provided with a support at at least one of its extremities, which support is movable to an inoperative position to permit the placing of a tube upon the mandrel.

Tube cutting machines have heretofore been known which have been provided with a manually operable and adjustable support for the end of the mandrel, over which the tube is adapted to be placed, such support requiring the individual attention of an operator each time a tube is either placed on the mandrel or removed therefrom. With such type of support it is necessary for the operator, in placing the tube on the mandrel, to first remove the support from connection with the mandrel, then place the tube over the mandrel, and then again bring the support into cooperative relationship with the mandrel, fastening the support in such position, then to perform the cutting or other desired operation, and then to reverse the procedure above mentioned in order to remove the cut tube from the mandrel.

I provide a tube-cutting machine comprising a rotary mandrel or carrier, an instrumentality for operating upon material carried thereby, means for rendering such instrumentality operative and inoperative, a support for the carrier adapted to assume operative and inoperative positions, and means effective upon operation of such first mentioned means for moving the support. By such provision an individual operation in adjusting the mandrel support is eliminated, the opetrator controlling the mandrel support and the tube cutting means by a single control member.

I also provide an improved bearing for the mandrel whereby movement of the mandrel support from inoperative to operative position, and vice versa, may be accomplished without unduly wearing the bearing.

Figure 1:
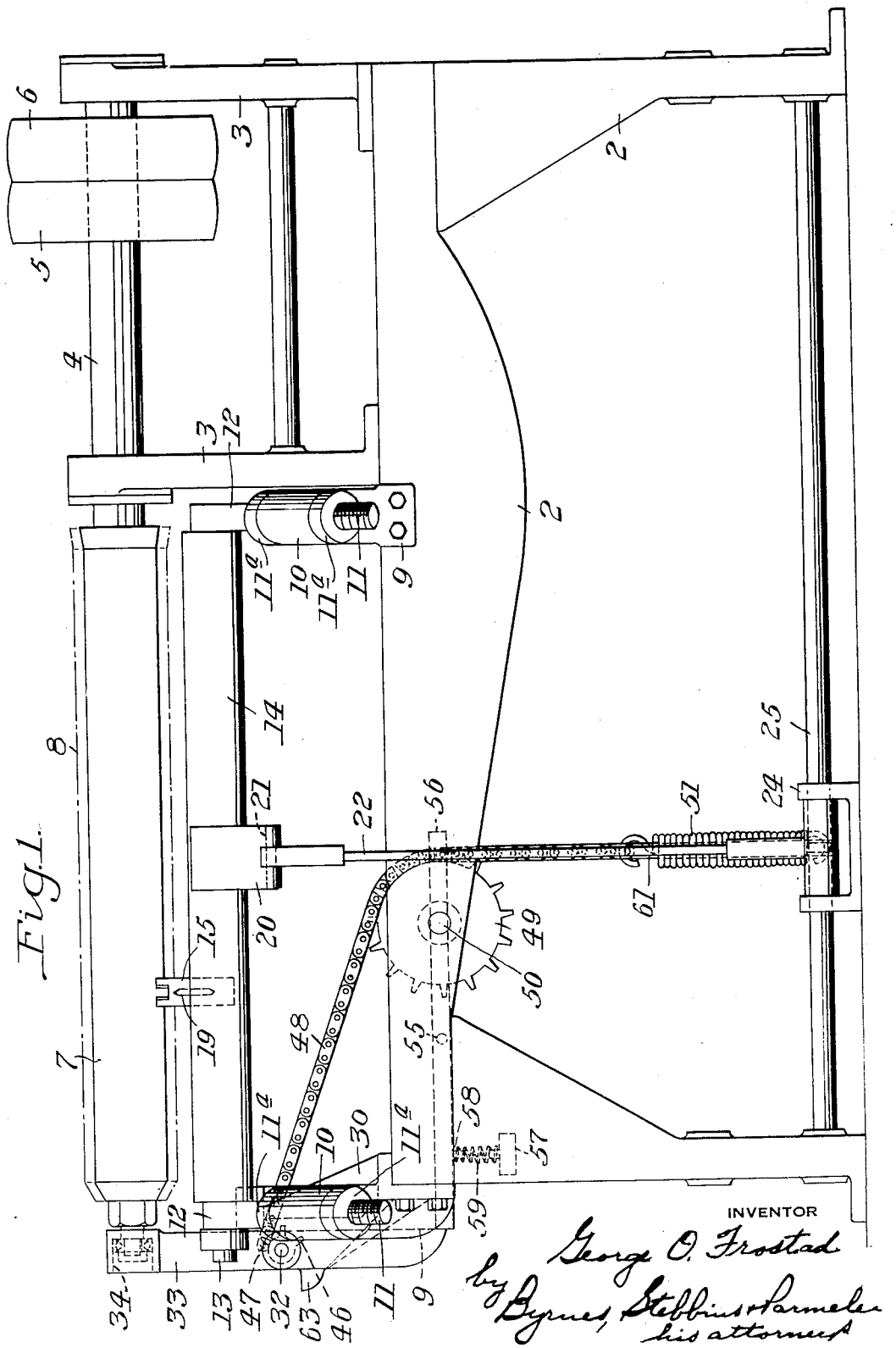
Figure 2:
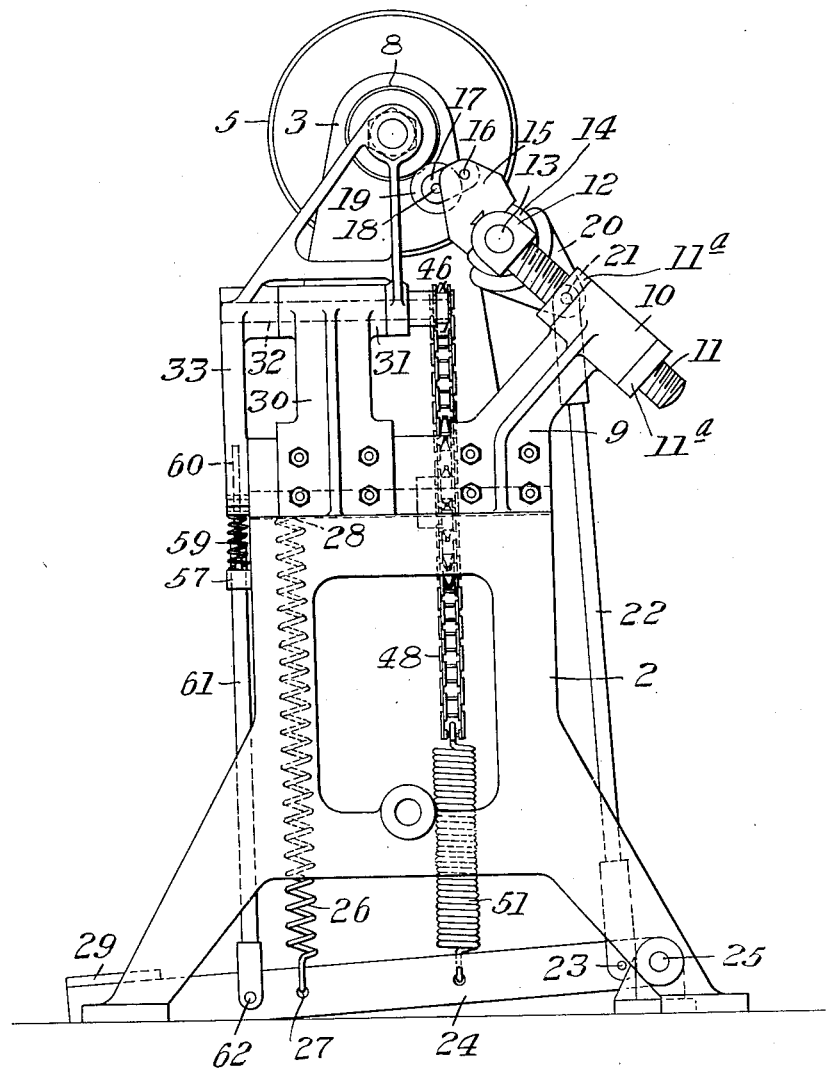

In the accompanying drawings I have shown a present preferred embodiment of the invention wherein, Figure 1 is a side elevational view of a tube cutting machine having my invention applied thereto;

Figure 2 is an end elevational view of the tube cutting machine shown in Fig. 1, and Figure 3 is a detail view to enlarged scale showing my improved mandrel support.

Referring more particularly to the drawings, reference numeral 2 indicates generally a frame upon which are mounted bearing extensions 3. Journaled in the bearings provided by the extensions 3 is a shaft 4 upon which are mounted fast and loose pulleys 5 and 6. The shaft 4 extends longitudinally beyond one of the bearing supports 3 and is provided at such extension with a mandrel 7 adapted to receive a tube, shown in Fig. 1 in dot-and-dash lines at 8.

The frame 2 is provided with extensions 9 carrying cylindrically bored bosses 10. Passing through each of the bosses 10 is a screw 11 to which at one extremity is attached a bearing 12. Each screw 11 is maintained in adjusted position within its boss 10 by nuts 11ª. The screws are preferably coarsely threaded to provide for a bearing fit within the respective bosses. Journaled in the bearings 12 is a shaft 13 received within a tubular member 14. Connected to the member 14 is one or more cutter supports 15. Pivoted to each cutter support at 16 is a cutter wheel support 17 in which is journaled at 18 a cutter wheel 19.

Attached to the member 14 is a boss 20 to which is pivoted at 21 a control rod 22. The control rod 22 is in turn pivoted at 23 to a treadle 24, pivoted to the frame 2 at 25. The treadle 24 is urged upwardly by a spring 26 connected to it at 27 and to the frame at 28. Downward pressure upon the foot rest 29 of the treadle depresses the treadle against the action of the spring 26, moving downwardly the control rod 22 and causing rotation of the boss 20 and the member 14 in a clockwise direction, viewing Fig. 2, which in turn causes an upward swinging movement of the cutter wheel 19 to bring it into cutting relationship with a tube 8 upon the mandrel 7.

Connected to the frame 2 is an extension 30 provided with a bearing 31, in which is journaled a shaft 32. Keyed to the shaft 32 is a frame 33 provided at its upper extremity with a circular recess 34 extending completely therethrough, one extremity 35 of such recess being of relatively small diameter, an intermediate portion 36 of the recess being of relatively larger diameter and the opposite extremity 37 of the recess being of slightly larger diameter than the portion 36, and being internally screw-threaded as shown at 38.

Adapted to be received within the portion 36 of the recess 34 is a ball bearing 39. The external diameter of the ball bearing is such that it will snugly fit within the portion 36 of the recess, the bearing abutting against the shoulder 40 between the extremity 35 and the portion 36. An externally screw-threaded plug 41 provided with a peripheral extension 42 adapted to abut against the face of the ball bearing opposite the shoulder 40 is threaded within the extremity 37 of the recess 34 to maintain the ball bearing in place.

The ball bearing 39 is adapted to receive and rotatably support a reduced extension 43 on the mandrel 7. The extension 43 is connected to the extremity 44 of the mandrel, forming a shoulder 45 between the extension 43 and the extremity 44. Such shoulder 45 is adapted to abut against the inner face of the ball bearing 39.

The internal diameter of the ball bearing 39 is substantially greater than the external diameter of the extension 43. This is to provide for pivotal movement of the frame 33 and the bearing 39 about the shaft 32, into and out of operative relationship with the mandrel, without undue wear to the bearing or mandrel extension, which would otherwise occur by reason of the angular displacement of the bearing with relation to the mandrel.

The outer face of the ball bearing 39 and the end face of the mandrel extension 43 lie substantially in a vertical plane passing through the axis of the shaft 32. By reason of this provision clockwise rotation of the frame 33, viewing Figure 3, is effective for causing the ball bearing 39 in moving from operative to inoperative position with respect to the mandrel, to move slightly upwardly during the first increment of its motion, and thus to move out of contact with the mandrel extension 43 without binding or undue wear. This will be apparent from Fig. 3 of the drawings.

Keyed to the shaft 32 is a sprocket 46 having fastened thereto at 47 the extremity of a sprocket chain 48 adapted to pass over the teeth of the sprocket 46 upon clockwise rotation of the latter, viewing Figure 3. The sprocket chain 48 meshes with and passes over a sprocket wheel 49 journaled in the frame 2 at 50. The end of the sprocket chain opposite that connected to the sprocket 46 is connected through a coil spring 51 to the treadle 24.

Connected to the frame is a hollow cylindrical member 52 which receives a compression spring 53 operating against a plunger 54 and exerting a pressure on the frame 33, which tends to rotate it in a clockwise direction about its pivot 32, viewing Figure 3.

Pivoted to the frame at 55 is a lever 56. One extremity of the lever 56 when the same is in a horizontal position is in the same vertical plane as the inner face of the frame 33 when the latter is in a vertical position,—that is, is in operative relation with respect to the mandrel. Thus the said extremity of the lever 56 serves as a lock to maintain the frame 33 and the bearing 39 in operative relation with respect to the mandrel as shown in Figure 3, the lever 56 positively preventing clockwise rotation of the frame 33 when the lever is in a horizontal position.

Connected to the frame at 57 and to the lever 56 at 58 is a compression spring 59 tending to rotate the lever 56 in a counter-clockwise direction, viewing Figure 3.

At its extremity opposite that abutting the frame 33, the lever 56 is slotted vertically to receive a reduced extension 60 of an operating rod 61 pivotally connected at 62 to the treadle 24. The operating rod 61 is thus provided with a horizontal shoulder 62a adapted to abut upon vertical movement of the operating rod with the lower face of the lever 56, thus rotating such lever in a clockwise direction against the action of the spring 59, viewing Figure 3. The frame is provided with a horizontal stop 63 against which the outer face of the frame 33 is adapted to contact upon rotation of such frame through an arc of ninety degrees. The stop 63 therefore prevents rotation of the frame 33 beyond the horizontal position. The lower extremity of the frame 33 is rounded as shown at 64 so that it will ride smoothly over the lever 56 upon counter-clockwise rotation of the frame 33, viewing Figure 3, from the position shown in dot-and-dash lines in such figure to the vertical position shown in solid lines.

The manner in which depression of the treadle 24 brings the cutter wheels 19 into cutting relationship with the tube 8 has been described above. Depression of the treadle also is effective, preliminarily to the bringing of the cutter wheels into cutting relationship with the tube, for moving the frame 33 into supporting relationship with the mandrel, as will now be described. Assuming the frame 33 to be in the position shown in dot-and-dash lines in Figure 3, the treadle 24 will be held upwardly due to the action of the spring 26, the free end of the mandrel will be unsupported and the cutter wheels 19 will be down out of cutting relationship with the mandrel. Also when the treadle is in the raised position, the operating rod 61 is moved upwardly so that the shoulder 62a has moved the lever 56 clockwise, viewing Figure 3, so as to release the frame 33, permitting clockwise rotation thereof, to the position shown in dot-and-dash lines due to the action of the compression spring 52 and gravity.

The parts being in the position just mentioned, when depression of the treadle is commenced, the operating rod 61 first moves downwardly until the shoulder 62a passes a horizontal plane coinciding with the lower face of the lever 56 when in its horizontal position. Continued depression of the treadle tensions the strong spring 51 and, through such spring, pulls the sprocket chain downwardly and about the sprocket 49 which in turn actuates the frame 33 in a counter-clockwise direction, viewing Figure 3, against the action of the spring 52 and into supporting relationship with the mandrel 7. As soon as the lower corner of the frame 33 has passed the extremity of the lever 56, such lever under the action of the spring 59 moves upwardly, locking the frame 33 in supporting relation with the mandrel. Continued depression of the treadle is effective for moving the cutter wheels 19 into cutting relationship with the mandrel, as above described. Thus by a single movement of the foot of the operator the mandrel support is brought into supporting relationship with the mandrel and is locked in such position and the cutter wheels 19 are brought into cutting relationship with a tube which is in place on the mandrel. No adjustment or tightening of nuts and bolts is necessary each time a tube is placed over the mandrel or removed therefrom.

When it is desired to remove a cut tube from the mandrel the operator merely releases the treadle 24 whereupon it will move upwardly under the action of the spring 26, raising the operating rod 22 and moving the cutter wheels 19 to inoperative position. Continued upward movement of the treadle 24 causes the shoulder 62a on the operating rod 61 to strike against the lower surface of the lever 56, moving such lever in a clockwise direction against the action of the spring 59, viewing Figure 3, and thus releasing the frame 33, whereupon such frame moves in a clockwise direction until it rests upon the stop 63.

By reason of the ball bearing being substantially larger in diameter than the extension 43 on the mandrel, when the mandrel is rotated it will tend to find its neutral perpendicular center within the ball bearing. However, due to the upward pressure of the cutter wheels, the top of the mandrel extension 43 will be caused to ride against the lower portion of the top of the ball race as shown in Fig. 3. The advantage of providing the bearing of greater diameter than the mandrel extension has been mentioned above.

While I have shown and described a present preferred embodiment of the invention, it is to be distinctly understood that the same is not limited thereto but may be otherwise embodied within the scope of the following claims.

I claim:—

1. In a machine of the class described, a rotary carrier, an instrumentality for operating upon material carried thereby, means for rendering such instrumentality operative and inoperative, a support for the carrier adapted to assume operative and inoperative positions, means effective upon operation of such first mentioned means for moving the support, and a manually operable control lever connected with both of said means and effective by a single movement for controlling both said instrumentality and said support.

2. In a machine of the class described, a rotary carrier, a support therefor adapted to assume operative and inoperative positions, an instrumentality for operating upon material carried by the carrier, and a common control lever connected with both said support and said instrumentality effective for rendering both of the same operative upon actuation thereof.

3. In a machine of the class described, a rotary carrier, a support therefor swingable into and out of operative position with respect thereto, an instrumentality for operating upon material carried by the carrier, and means operable to render such instrumentality operative and to swing the support into operative position.

4. In a machine of the class described, a rotary carrier adapted to be supported at an end thereof, a pivoted support rotatable into and out of operative position with respect to the carrier, a master control member for the machine, and means operated by the master control member for rotating the support about its pivot.

5. In a machine of the class described, a rotary carrier having bearing engaging means thereon, a bearing mounted to be movable into and out of supporting relationship with the carrier, and manually operated and normally out of supporting relationship therewith, a control member, and resilient means operated by said control member for moving the bearing into supporting relationship with the carrier.

6. In a machine of the class described, a rotary carrier having bearing engaging means thereon, a pivoted arm having a bearing therein adapted to cooperate with the bearing engaging means on the carrier, and a control device for the machine effective in operation thereof and comprising means cooperating with the arm and connected therewith for rotating the same about its pivot generally in a plane containing the axis of the carrier to bring the bearing and bearing engaging means into cooperative relation.

7. In a machine of the class described, a rotary carrier, a support therefor, means for moving the support into cooperative relation with the carrier, means for locking the support in such position, and means controlled by such first mentioned means for releasing the locking means.

8. In a machine of the class described, a rotary carrier, a support therefor movable into and out of cooperative relation therewith, manually operable means for moving the support into cooperative relation with the carrier, means for locking the support in such cooperative relation, and means controlled by said manually operable means for unlocking the support.

9. In a machine of the class described, a rotary carrier, a support therefor movable into and out of cooperative relation therewith, means for moving the support into cooperative relation with the carrier and means for locking the support in such position, said first mentioned means having a contact portion adapted to contact with the locking means to release the support.

GEORGE O. FROSTAD.